United States Patent [19]

Blunden

[11] Patent Number: 4,668,140
[45] Date of Patent: May 26, 1987

[54] RAILROAD CAR WITH CHOCK BLOCK APPARATUS FOR SECURING TRANSPORTED VEHICLES

[75] Inventor: Donald J. Blunden, Plymouth, Mich.

[73] Assignee: Thrall Car Manufacturing Company, Chicago Heights, Ill.

[21] Appl. No.: 805,744

[22] Filed: Dec. 6, 1985

[51] Int. Cl.[4] ............................ B61D 3/18; B60P 3/07
[52] U.S. Cl. ...................................... 410/10; 410/12; 410/20; 410/23; 410/30
[58] Field of Search ....................... 410/7–12, 410/19, 20, 21, 23, 24, 26, 30

[56] References Cited

U.S. PATENT DOCUMENTS

| 1,778,162 | 10/1930 | Mills et al. | 410/30 X |
| 1,906,022 | 4/1933 | Tobin | 410/21 |
| 3,841,235 | 10/1974 | Wheeler et al. | 410/12 |

FOREIGN PATENT DOCUMENTS

| 1469877 | 2/1967 | France | 410/30 |

Primary Examiner—Randolph A. Reese
Attorney, Agent, or Firm—Marshall, O'Toole, Gerstein, Murray & Bicknell

[57] ABSTRACT

A railroad car having at least one deck for supporting and transporting four-wheel vehicles such as automobiles and trucks including a track secured to the deck longitudinally of the railroad car; a pair of movable chock blocks for each vehicle transported on the deck to secure the vehicle against longitudinal movement; each chock block including a bar with a first end and a second end; and pins on the bar first end for removably and releasably engaging holes in the track when the bar is substantially lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track.

23 Claims, 11 Drawing Figures

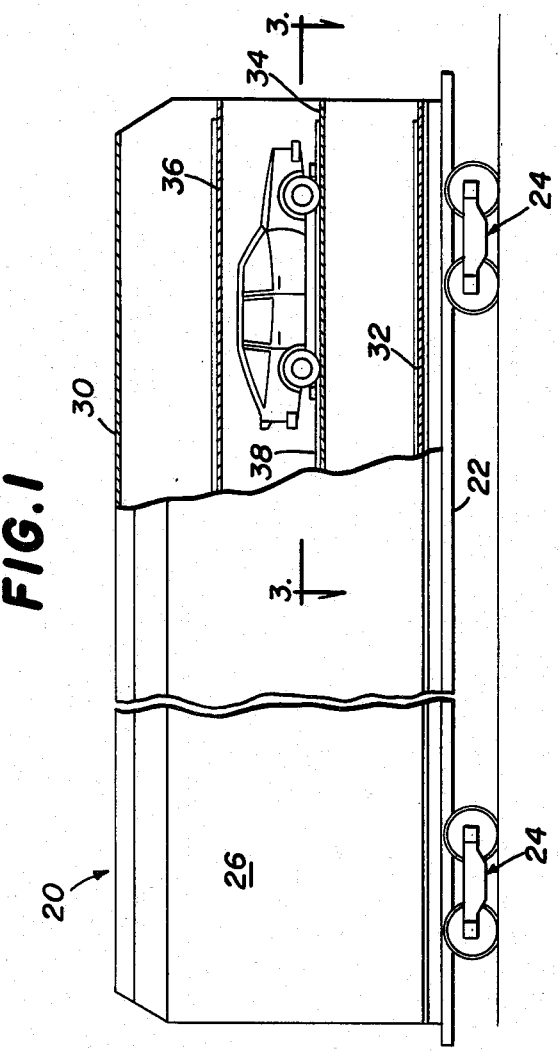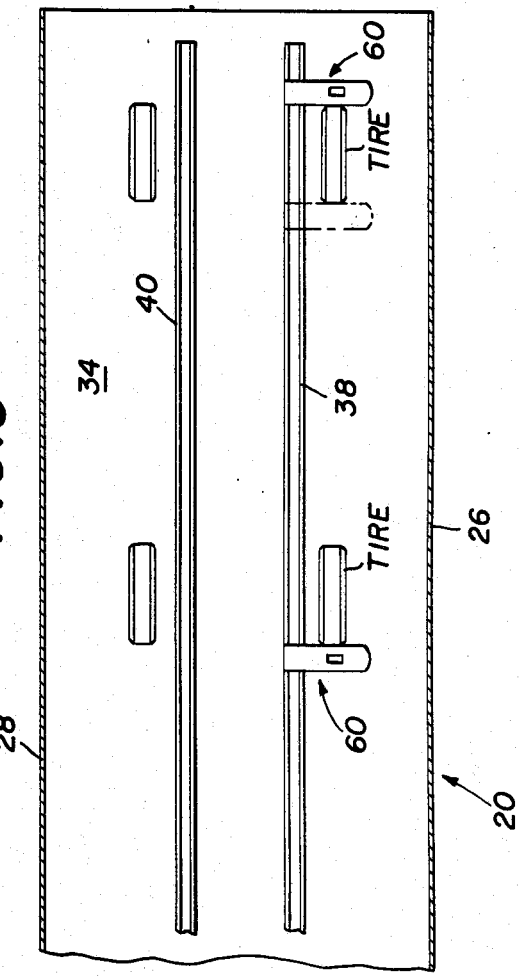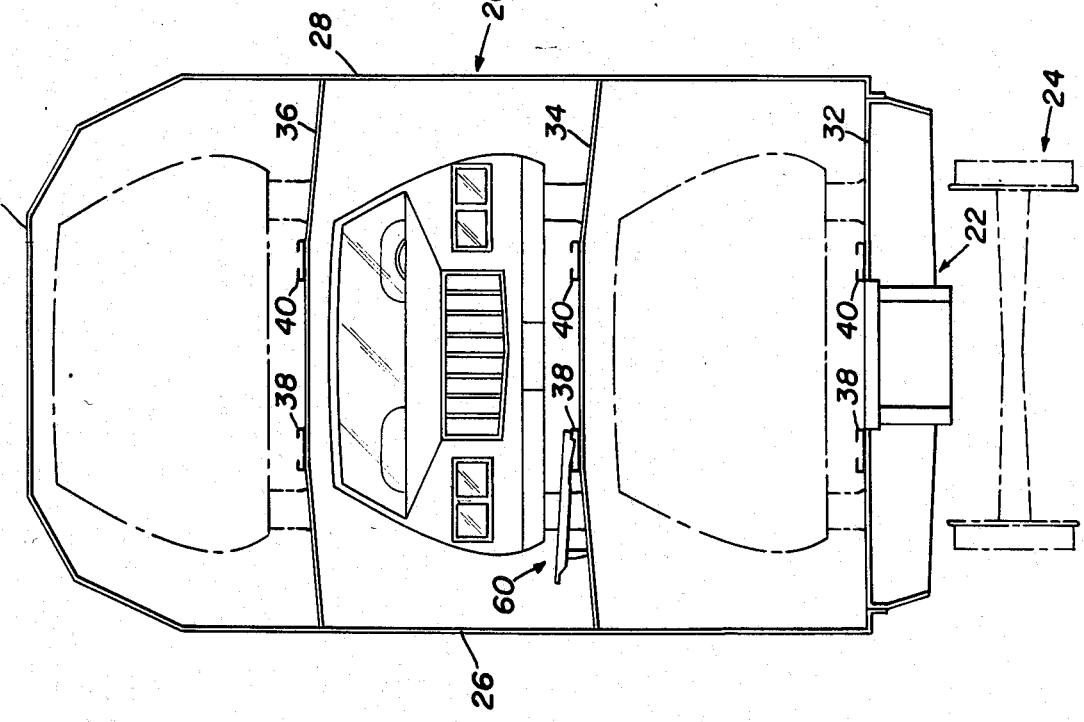

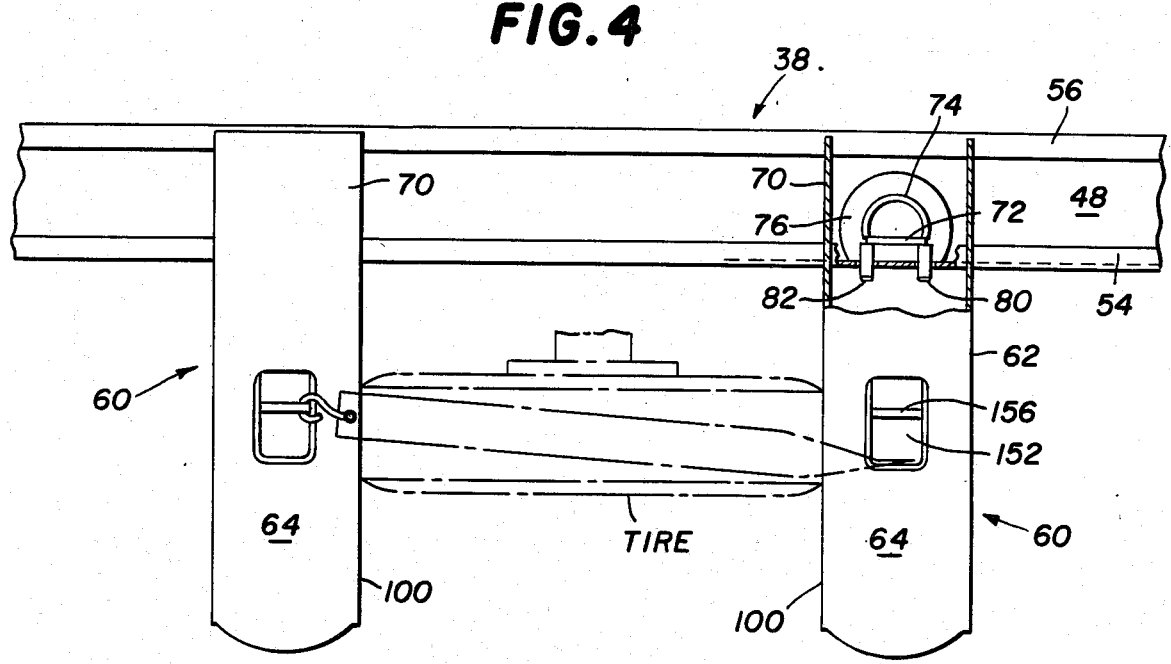
FIG.4
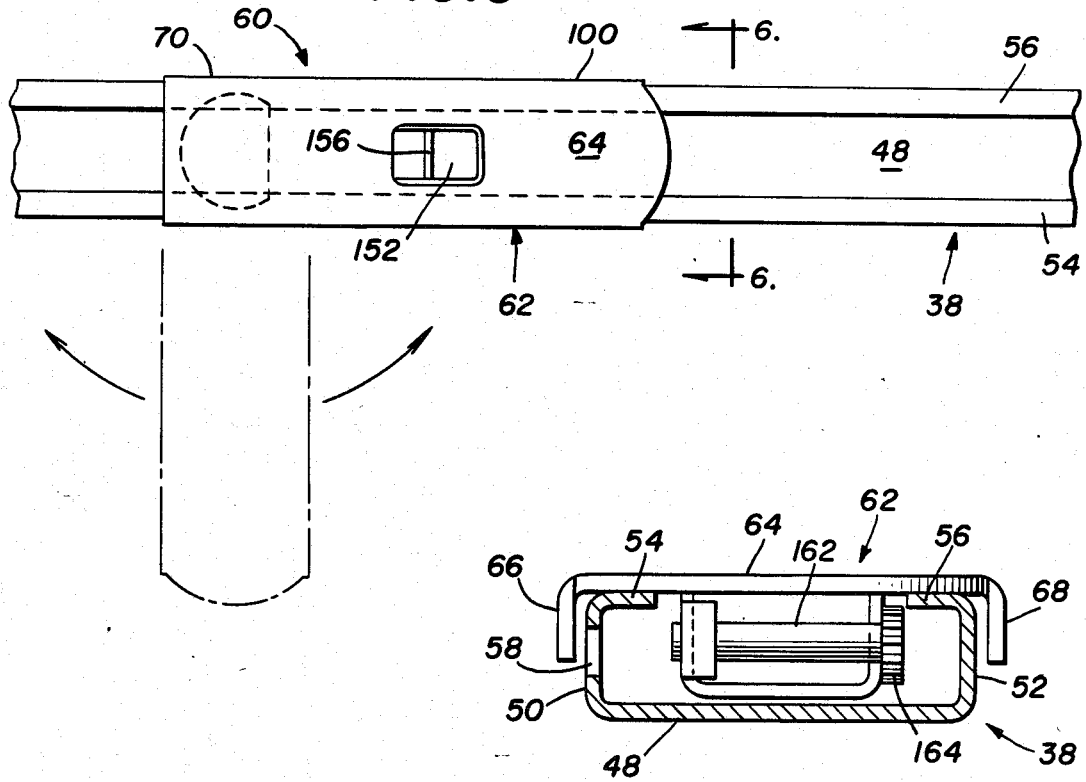
FIG.5
FIG.6

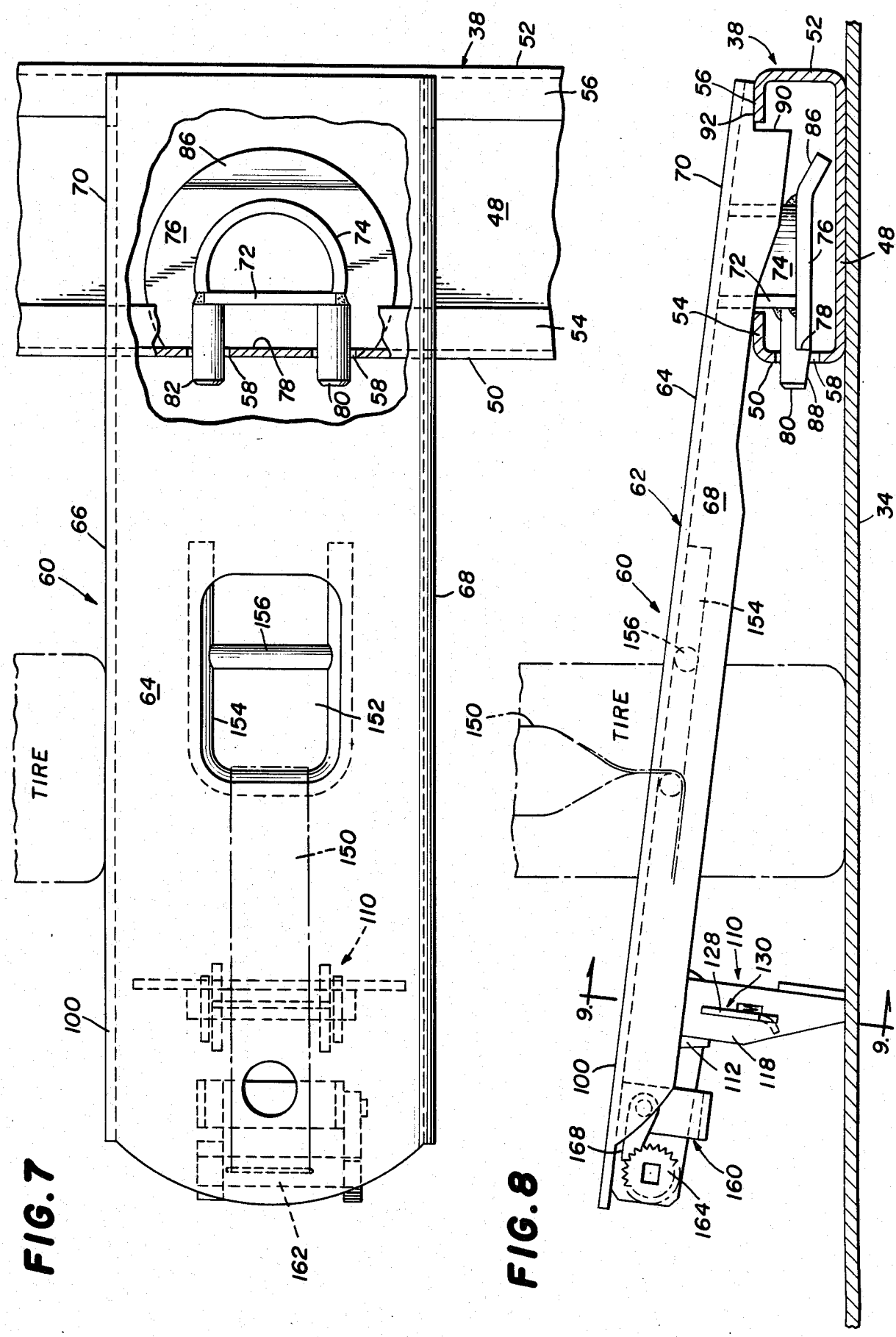

RAILROAD CAR WITH CHOCK BLOCK APPARATUS FOR SECURING TRANSPORTED VEHICLES

This invention relates to railroad cars used to transport vehicles such as automobiles and trucks. More particularly, this invention is concerned with improved chock block apparatus for, and method of, securing vehicles being transported on such railroad cars.

BACKGROUND OF THE INVENTION

Special railroad cars are used to transport vehicles such as automobiles and trucks from manufacturing plants to distribution centers. Such railroad cars are often referred to as auto rack cars. The number of decks which support the vehicles depends on the type of vehicles to be transported. Although some cars have a single deck it is more common to have two or three decks. Each deck will usually carry about four to six vehicles in the United States.

It is necessary to tie down or secure each vehicle to its supporting deck so that it remains in position while the railroad car moves from its point of loading to its destination. The system used to tie down each vehicle must be able to hold it securely even when the railroad car is subjected to buff and draft forces as well as when it rocks, rolls and bumps.

One of the ways widely used in the United States to tie down vehicles requires a pair of parallel tracks, spaced apart about forty inches outside, on each deck. The four wheels of each vehicle span the tracks and thus provide centering guides when the vehicles are driven onto the railroad car in column formation in so-called circus loading. After a vehicle is properly positioned on a deck it is pulled down tightly by use of four chains. Two chains are used at each end. Each chain free end is hooked to the vehicle frame or body adjacent the track. The chain extends downwardly to a carriage releasably slidable in the track and carrying a winch for tightening the chain. Such apparatus is disclosed in U.S. Pat. Nos. 3,566,803; 3,564,577; 3,374,008 and 3,673,969.

Although the described tie down apparatus has been successfully used for many years, recent vehicle structural changes have lowered road clearance, indicating that alternative systems should be used. Thus, it is no longer desirable to use a tie down system which pulls the body down and compresses the vehicle springs because this lowers the clearance between the vehicle underbody parts including mufflers, tailpipes and the like, and the deck. When the railroad car bumps and pitches, it can hit the deck and cause damage to the vehicle. Additionally, to withstand the tension applied to the underbody of the vehicle where the hooks are attached, special reinforcement must be added with increased cost solely to transport the vehicle and with no general benefit to the vehicle once it reaches its destination.

A further disadvantage of the prior art tie down system is that the laborer must have access to both sides of the vehicle; thus, space must be provided for him to work and walk on both sides. For some vehicles it is considered that tie down on one side only would be adequate if a suitable system is available. This would reduce the laborers time and lower costs.

Another disadvantage is that chains used to secure the vehicle essentially make inoperative the suspension system of the vehicle. This allows stresses imposed by rail shipment to be transmitted directly to the structure and mechanical parts of the vehicle.

From the above discussion it is believed clear that alternative tie down apparatus for vehicles transported by railroad car which eliminate some or all of the disadvantages of the prior art systems is needed.

SUMMARY OF THE INVENTION

According to one aspect of the invention, a railroad car is provided having at least one deck for supporting and transporting four-wheel vehicles such as automobiles and trucks including a track secured to the deck longitudinally of the railroad car; a pair of movable chock block means for each vehicle transported on the deck to secure the vehicle against longitudinal movement; each chock block means including a bar with a first end and a second end; and means on the bar first end for removably and releasably engaging the track when the bar is substantially lateral to the track and spaced above the deck, and adjoining a vehicle tire, to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track.

The track can have a vertical longitudinal wall with a plurality of spaced-apart holes in a line and the bar first end can have at least one, and desirably at least two, pins which engage with the holes in the wall.

A particularly desirable track is in the form of a channel member and includes a pair of spaced-apart first and second longitudinal vertical walls defining a space therebetween; the first wall having a plurality of spaced-apart holes in a line with the bar first end having one or more pins which engage with the holes in the first wall from the space between the channel walls.

Each pin can be mounted beneath the bar bottom and longitudinal to the bar and inward from the bar first end. Also, the pin free ends can be pointed toward the bar second end.

It is desirable for the bar first end to extend over the top of, and be in contact with, the track when the pin is in the hole and for buttress walls to project downwardly, from the bar first end, to adjoin the track walls and thereby prevent lateral and pivotal movement of the bar relative to the track. The bar, when so positioned, will generally be approximately horizontal although the bar second end will be, to some extent, higher than the first end and higher than the track.

The buttress walls can include first and second spaced-apart walls; the first buttress wall can be adjacent the pin and located inward from the end of the bar first end and the second buttress wall can be adjacent the end of the bar first end, so that downward rotation of the bar second end toward the deck pivots the second buttress wall above the track second wall as a result of which movement of the bar lateral to the track frees the pin from the hole thereby permitting the bar to be released from the track.

The bar second end desirably includes support means for positioning it above the deck surface, and desirably higher than the track. The support means can constitute a pivotal leg with means to lock it on the bar in substantially vertical and horizontal positions.

The bar of each chock block means can have means to receive and secure to it the end of a tie-down strap which runs over the tire of a vehicle. It can include means, such as a winch, for applying tension to the strap.

According to a further embodiment of the invention there is provided a method of securing a four-wheel vehicle on a railroad car having at least one deck for supporting and transporting four-wheel vehicles comprising securing a track to the deck longitudinally of the railroad car; positioning a movable chock block means in front of a tire and another chock block means in back of a tire on the same side of a vehicle to secure the vehicle against longitudinal movement; each chock block means including a bar with a first end and a second end; the bar first end having means for removably and releasably engaging the track when the bar is substantially lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track; and attaching the means on the bar first end of each chock block means to the track adjacent a vehicle tire to block the vehicle from rolling forward or backward.

Desirably, one bar is placed in front, and the other in back, of the same tire and a restraining strap, connected to each bar, is run over the tire and tension is applied to the strap.

In practicing the method it is desirable for the track to be a channel member having a pair of spaced-apart first and second longitudinal vertical walls with the first wall having a plurality of spaced-apart holes in a line, for the bar first end to have at least one pin, and to engage the pin with a hole in the first wall from the space between the channel walls.

When the pin is in the hole, the bar first end extends over the top of the track and buttress walls projecting downwardly from the bar first end are positioned adjoining the track walls thereby preventing lateral and pivotal movement of the bar relative to the track. The buttress walls include first and second spaced-apart walls; the first buttress wall is adjacent the pin and is located inward from the end of the bar first end; the second buttress wall is adjacent the end of the bar first end; so that by downward rotation of the bar second end toward the deck, the second buttress wall pivots or is raised above the track second wall so that longitudinal movement of the bar toward the track frees the pin from the hole thereby permitting the bar to be lifted free of the track.

BRIEF DESCRIPTION OF THE DRAWINGS

FIG. 1 is a side elevation of a railroad car having chock block apparatus connected to a track on the car decks according to the invention;

FIG. 2 is an end view of the railroad car shown in FIG. 1;

FIG. 3 is a sectional view of FIG. 1 taken along the line 3—3;

FIG. 4 is a plan view of the chock block apparatus, according to the invention, connected to a track on a railroad car deck and abutting a vehicle tire;

FIG. 5 is a plan view showing the chock block apparatus of FIG. 4 in stowed position;

FIG. 6 is a sectional view of FIG. 5 taken along the line 6—6;

FIG. 7 is an enlarged plan view of the chock block apparatus shown in FIGS. 4 to 6;

FIG. 8 is a side elevational view of FIG. 7;

DETAILED DESCRIPTION OF THE DRAWINGS

Figure 9:
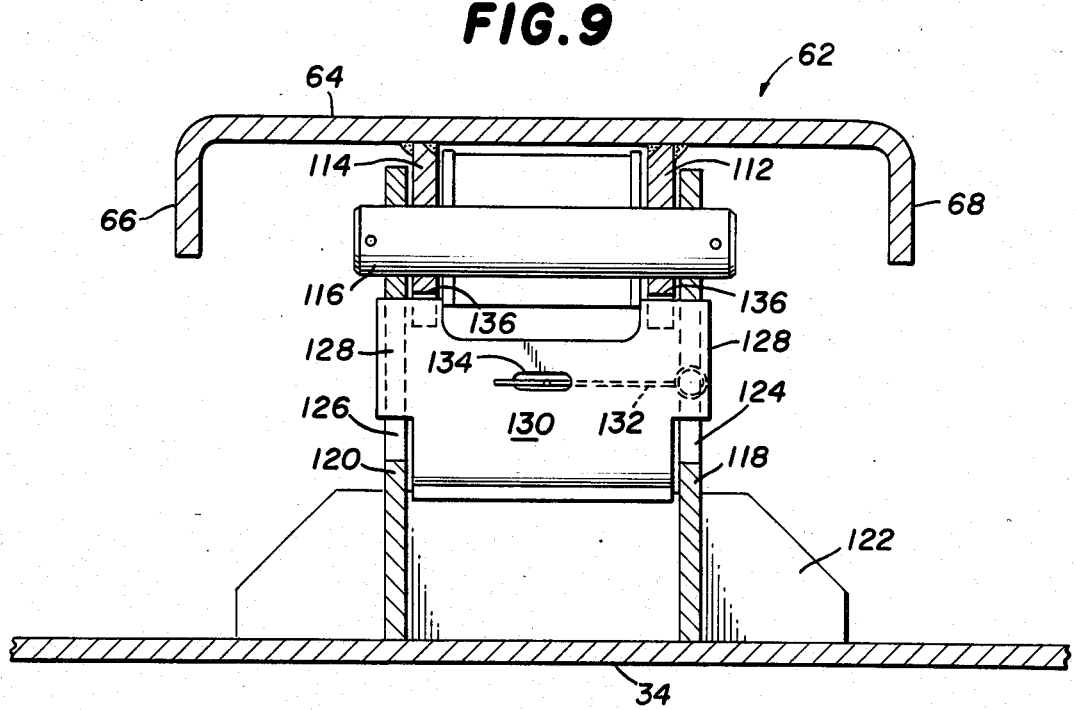
FIG. 9 is a sectional view of FIG. 8 taken along the line 9—9.

To the extent it is reasonable and practical the same or similar elements or parts which appear in the various views of the drawings will be identified by the same numbers.

With reference to FIGS. 1 to 3, the railroad car 20 has an underframe 22 supported by a pair of wheel trucks 24. Extending upwards from underframe 22 are sidewalls 26,28 to which roof 30 is connected.

The railroad car 20 has three decks 32,34 and 36. Deck 32 is supported on underframe 22 and decks 34 and 36 are supported by column members, not shown, along the sides of the car 20. The height between adjacent decks and between the top deck 36 and the car roof 30 is approximately equal.

The railroad cars now used in the United States to transport vehicles generally have two spaced apart longitudinal channel shaped tracks 38,40 (FIGS. 1 to 3) on each deck for use in securing vehicles in place. They are spaced about forty inches apart, outside dimension, so that they lie between the pair of wheels on each side of the vehicles. At least one of these tracks is suitably employed with the chock block apparatus provided by the invention. For convenience, track 38 is selected and in the subsequent description the invention will be discussed primarily with respect to it. It should be understood, however, that in new railroad cars, track 38 can be a new track and that track 40 may or may not be included.

As shown in FIGS. 4 to 6, track 38 is channel shaped (FIG. 6) with a flat bottom 48, side walls 50,52 and inwardly directed horizontal top flanges 54,56 which terminate in edges spaced apart from each other, thereby defining a longitudinal gap or space. The side wall 50 has spaced apart horizontal holes 58 located side-by-side in a straight line.

A chock block apparatus 60 is secured in track 38 so that it is not readily removable therefrom but so that it can be moved along the longitudinal axis of the track and be rotated clockwise or counterclockwise from about lateral to about parallel to track 38 (FIGS. 4 to 6). The chock block apparatus 60 includes a bar 62. The bar 62 is shown as a channel member having a top 64 and downwardly depending sides 66,68.

A first end 70 of bar 62 is movably secured to track 38 leaving the second end 100 free.

The first end 70 of bar 62 has an approximately vertical buttress wall plate 72 (FIGS. 4, 7 and 8) downwardly projecting from the lower surface of top 64. Additionally, a semi-cylindrically shaped plate 74 is also joined to the lower surface of top 64. The vertical ends of plate 74 are joined to the vertical ends of buttress wall plate 72. A plate 76 of generally circular shape, but having a straight buttress edge 78, is joined to the bottom of plates 72,74. Buttress wall plate 72 and the straight edge 78 are intended, respectively, to abut flange 54 and the inner surface of sidewall 50 of track 38 when the chock block apparatus 60 is in use and positioned against a vehicle tire.

A pair of spaced apart substantially horizontal pins 80,82 are joined to the top of plate 76 and the side of vertical buttress plate 72 (FIGS. 7 and 8). The pins 80,82 are spaced apart and dimensioned to be received simultaneously with clearance in a pair of holes 58 in track 38. The plate 76 has portion 86 bent downwardly so that it can be pushed beneath top flange 56 to disengage pins 80,82 from holes 58. To aid in disengaging the pins from the holes, and to provide a lower profile when in stored position, the pins are provided with a downwardly sloped bottom end portion 88 (FIG. 8).

The side walls 66,68 of bar 62 are cut out at the end 70 to provide a pair of substantially vertical buttress walls 90 (FIG. 8) which are located close to the edge of top flange 56 when the chock block apparatus is in blocking position against a vehicle tire. When so positioned the pair of substantially horizontal edges 92 formed by said cut outs in side walls 66,68 contact the top of flange 56 and prevent the bar 62 from being raised further by lifting the second end 100 of bar 62.

When bar 62 is positioned as shown in FIGS. 7 and 8 it is locked to track 38 and cannot be moved longitudinally, nor can the bar 62 be rotated clockwise or counterclockwise, with respect to the track. It is intended that the bar, when so locked, be adjacent a vehicle tire so that it functions as a chock block apparatus.

Figure 10:
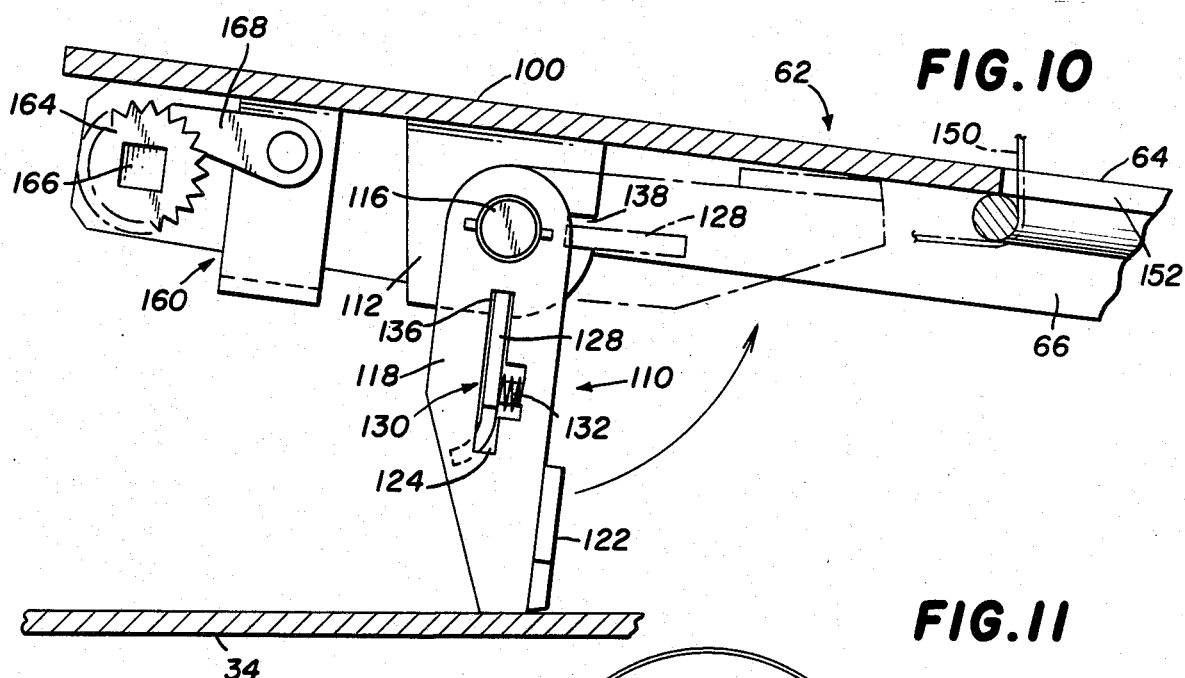
FIG. 10 is an enlarged side elevational view of the end of the chock block apparatus, as shown in FIG. 8, having the supporting leg.

The second end 100 of bar 62 is provided with a support 110 pivotally mounted to the underside of the top 64 of bar 62. Thus, a pair of spaced apart downwardly extending plates 112,114 are joined to the lower surface of top 64 (FIGS. 8 to 10). Pivot pin 116 extends through plates 112,114 and through a pair of plates 118,120 which together function as a rotatable support leg for bar 62. The plates 118,120 are connected in spaced apart position by plate 122. Each of plates 118,120 has a respective slot 124,126 in which the tabs 128 on the side edges of lock plate 130 are slidably received. A finger spring 132 mounted on plate 118 and extending into opening 134 of lock plate 130 continuously urges lock plate 130 in the direction of pin 116. As a result, when plates 118,120 are about vertical, as shown in FIGS. 9 and 10, the top edge of lock plate 130 is biased into slots 136 in the bottom of plates 112,114, thereby locking the plates 118,120 in vertical position so that together they function as a support leg for the second end 100 of bar 62 and maintain it in raised position. When the bar second end 100 is in raised position, the first end 70 of bar 62 cannot be removed from lateral position with respect to track 38 shown in FIGS. 4, 7 and 8 and in which position it functions as a chock block apparatus.

By pulling down on the curved bottom portion of lock plate 128, the lock plate 128 is withdrawn from slots 136, thereby permitting rotation of plates 118,120 counterclockwise as shown in FIG. 10 until the lock plate 130 is opposite slots 138 in the side edges of plates 112,114. Releasing the lock plate then permits the spring 132 to bias lock plate 130 into slots 138 and thereby hold plates 118,120 in a raised horizontal position as shown in phantom in FIG. 10. With the bar support 110 in such raised position the bar second end 100 can be lowered to the car deck 34. This causes the bar first end 70 to pivot on flange 54 and raise buttress walls 90 above flange 56. Bar 62 can then be pushed laterally toward track 38 to disengage pins 80 from holes 58. With plate 76 located beneath track flanges 54,56 the bar first end 70 can be moved longitudinally along track 38 without removing it or separating it from the track. By rotating bar 62 about 90° the bar can be placed in alignment with and over the track 38 and thus stowed in and on the track (FIG. 5). The bar second end is maintained in stowed position because the plates 118,120 fit in the gap between flanges 54,56 of track 38. To reposition the apparatus for chocking a vehicle the described operation is reversed.

The chock block apparatus 60 can be used in several ways to secure a vehicle on a railroad car. Thus, the same wheel or tire can be chocked front and back as shown in FIG. 4. Another way is to chock two tires on the same side of the vehicle by using one bar 62 per tire placed in front with respect to one tire and in back with respect to the other tire as shown in FIG. 3 in one of two such possible embodiments.

With small structural modifications the described chock block apparatus 60, optionally can be employed in combination with a restraining strap or belt 150 which runs over a vehicle tire and is connected at its ends to a chock block apparatus 60 located front and back of and adjacent the same tire as shown in FIG. 4.

Figure 11:
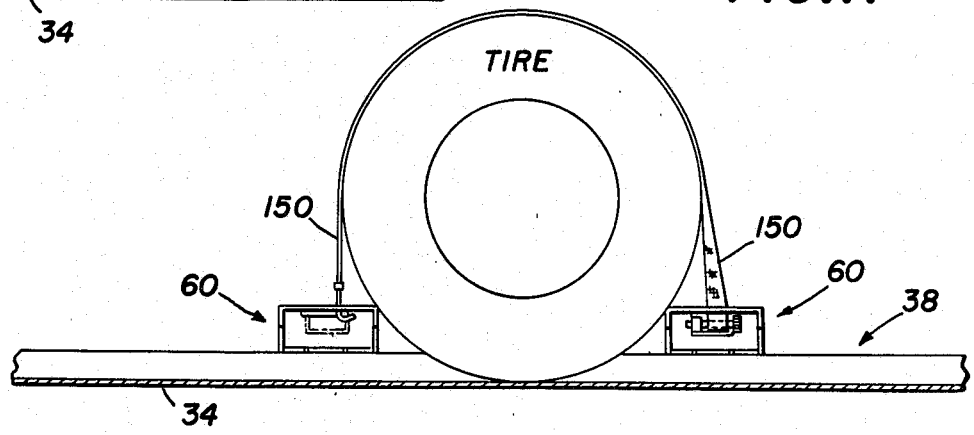
FIG. 11 is a side elevational view, partially in section, of the chock block apparatus shown in FIGS. 4 to 10 used in combination with a wheel holddown strap.

The bar 62 as shown in FIGS. 4, 7 and 8 can be provided with an opening 152 midway between the ends of the bar. A U-shaped member 154 formed from a round rod is welded to the bottom of bar top 64 to provide a smooth surface on which a strap can slide. Additionally, a round rod 156 is run across opening 152 and joined to U-shaped member 154. A hook (FIG. 11) on one end of strap 150 can be hooked onto rod 156. The strap 150 is then run over the top of the tire from one chock block apparatus 60 into engagement with another chock block apparatus 60 on the other side of the tire. The strap 150 is threaded through opening 152 and then through a channel guide 160 located beneath the second end 100 of bar 62. The strap is then wrapped on shaft 162 rotatably supported by bearing plates attached to the bottom of bar top 64. A ratchet wheel 164 is mounted on the end of shaft 162 which also has a square recess 166 for engagement by a crank handle, not shown. Ratchet pawl 168 is pivotally mounted on bracket 160 so as to releasably engage ratchet wheel 164. By operating the ratchet mechanism, which effectively constitutes a winch, in a conventional manner the belt 150 is suitably tightened to thereby apply a downward force on the tire and further secure the vehicle in position.

It is to be understood that when a restraining strap 150 is used, two of the chock block apparatus 60 are employed, one on each side of the tire, but that only one of the chock block apparatus 60 need be provided with a ratchet. Furthermore, it is not essential that a ratchet mechanism be utilized to tighten the strap. Other means, such as a simple buckle, can be suitably employed to tighten the strap.

The foregoing detailed description has been given for clearness of understanding only, and no unnecessary limitations should be understood therefrom, as modifications will be obvious to those skilled in the art.

What is claimed is:

1. A railroad car having at least one deck for supporting and transporting four-wheel vehicles such as automobiles and trucks including:

a track secured to the deck longitudinally of the railroad car;

a pair of movable chock block means for each vehicle transported on the deck to secure the vehicle against longitudinal movement;

each chock block means including a bar with a first end and a second end; and means on the bar first end for removably and releasably engaging the track when the bar is substantially horizontal and lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track by first downward movement of the bar and then lateral movement of the bar toward the track so that the bar first end can be released from and moved along the track.

2. A railroad car according to claim 1 in which:
the track has a vertical longitudinal wall;
the track wall has a plurality of spaced-apart holes in a line; and
the bar first end has at least one pin which engages with a hole in the wall.

3. A railroad car according to claim 2 in which the bar first end has at least two pins which simultaneously engage holes in the wall.

4. A railroad car according to claim 1 in which:
the track is a channel member and includes a pair of spaced-apart first and second longitudinal vertical walls defining a space therebetween;
the first wall has a plurality of spaced-apart holes in a line; and
the bar first end has at least one pin which engages with a hole in the first wall by inserting the pin in the hole from above the space between the channel walls.

5. A railroad car according to claim 1 in which:
the track is a channel member and it includes a pair of spaced-apart first and second longitudinal vertical walls defining a space therebetween;
the first wall has spaced-apart holes in a line; and
the bar first end has at least two pins which engage with holes in the first wall by inserting the pin in the hole from above the space between the channel walls.

6. A railroad car according to claim 1 in which:
the bar second end has displaceable support means for positioning it above the deck surface.

7. A railroad car according to claim 1 in which the bar has means to receive and secure the end of a tie-down strap which runs over the tire of a vehicle.

8. A railroad car according to claim 7 in which the means to receive and secure the end of a tie-down strap includes means for applying tension on the strap.

9. A railroad car having at least one deck for supporting and transporting four-wheel vehicles such as automobiles and trucks including:
a track secured to the deck longitudinally of the railroad car;
the track is a channel member and includes a pair of spaced-apart first and second longitudinal vertical walls defining a space therebetween;
the track first wall having a plurality of spaced-apart holes in a line;
a pair of movable chock block means for each vehicle transported on the deck to secure the vehicle against longitudinal movement;

each chock block means including a bar with a first end and a second end;
the bar first end having at least one pin which engages with a hole in the first wall from the space between the channel walls;
the pin is mounted beneath the bar bottom and longitudinal to the bar and inward from the bar first end;
the pin having a free end pointed toward the bar second end;
the bar second end having support means for positioning it spaced above the deck surface;
the bar first end extending over the top and in contact with the track with the pin in the hole; and
buttress walls projecting downwardly, from the bar first end, adjoining and contactable with the track walls thereby preventing lateral and pivotal movement of the bar relative to the track when the bar second end support means positions it spaced above the deck surface.

10. A railroad car having at least one deck for supporting and transporting four-wheel vehicles such as automobiles and trucks including:
a track secured to the deck longitudinally of the railroad car;
the track being a channel member having a pair of spaced apart first and second longitudinal vertical walls defining a space therebetween;
the first wall having a plurality of spaced apart holes in a line;
a pair of movable chock block means for each vehicle transported on the deck to secure the vehicle against longitudinal movement;
each chock block means including a bar with a first end and a second end;
the bar first end having at least one pin which engages with a hole in the first wall from the space between the channel walls;
the pin being mounted beneath the bar bottom and longitudinal to the bar and inward from the bar first end; and
means on the bar first end for removably and releasably engaging the track when the bar is substantially horizontal and lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track.

11. A railroad car according to claim 10 in which the pin has a free end pointed toward the bar second end.

12. A railroad car having at least one deck for supporting and transporting four-wheel vehicles such as automobiles and trucks including:
a track secured to the deck longitudinally of the railroad car;
the track being a channel member having a pair of spaced apart first and second longitudinal vertical walls defining a space therebetween;
the first wall having a plurality of spaced apart holes in a line;
a pair of movable chock block means for each vehicle transported on the deck to secure the vehicle against longitudinal movement;
each chock block means including a bar with a first end and a second end;

the bar first end having at least one pin which engages with a hole in the first wall from the space between the channel walls;

the bar first end extending over the top of the track with the pin in the hole;

buttress walls projecting downwardly, from the bar first end, adjoining and contactable with the track walls thereby preventing lateral and pivotal movement of the bar relative to the track; and means on the bar first end for removably and releasably engaging the track when the bar is substantially horizontal and lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track.

13. A railroad car according to claim 12 in which:

the buttress walls include first and second spaced-apart walls;

the first buttress wall is adjacent the pin and is located inward from the end of the bar first end;

the second buttress wall is adjacent the end of the bar first end; and downward rotation of the bar second end toward the deck pivots the second buttress wall above the track second wall so that longitudinal movement of the bar toward the track frees the pin from the hole thereby permitting the bar to be lifted free of the track.

14. A railroad car having at least one deck for supporting and transporting four-wheel vehicles such as automobiles and trucks including:

a track secured to the deck longitudinally of the railroad car;

the track being a channel member having a pair of spaced apart first and second longitudinal vertical walls defining a space therebetween;

the first wall having spaced apart holes in a line;

a pair of movable chock block means for each vehicle transported on the deck to secure the vehicle against longitudinal movement;

each chock block means including a bar with a first end and a second end;

the bar first end having at least two pins which engage with holes in the first wall from the space between the channel walls;

the bar first end extending over the top of the track with the pins in the holes;

buttress walls projecting downwardly, from the bar first end, adjoining and contactable with the track walls, thereby preventing lateral and pivotal movement of the bar relative to the track; and means on the bar first end for removably and releasably engaging the track when the bar is substantially horizontal and lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track.

15. A railroad car having at least one deck for supporting and transporting four-wheel vehicles such as automobiles and trucks including:

a track secured to the deck longitudinally of the railroad car;

a pair of movable chock block means for each vehicle transported on the deck to secure the vehicle against longitudinal movement;

each chock block means including a bar with a first end and a second end;

means on the bar first end for removably and releasably engaging the track when the bar is substantially horizontal and lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track; and the bar second end having a pivotal support leg for positioning the bar above the deck surface and the leg having means to lock it on the bar in substantially vertical and horizontal positions.

16. A railroad car having at least one deck for supporting and transporting four-wheel vehicles such as automobiles and trucks including:

a track secured to the deck longitudinally of the railroad car;

a pair of movable chock block means for each vehicle transported on the deck to secure the vehicle against longitudinal movement;

each chock block means including a bar with a first end and a second end;

means on the bar first end for removably and releasably engaging the track when the bar is substantially horizontal and lateral to the track and spaced above the deck to prevent the bar first end from moving lateral to and longitudinally along the track and from being displaced out of lateral position to the track by pivoting, relative to the track, about a vertical axis, said means permitting ready release of the bar first end from the track so that the bar first end can be moved along the track; and the bar has means to receive and secure the end of a tie-down strap which runs over the tire of a vehicle, including a winch for applying tension on the strap.

17. A railroad car having at least one deck for supporting and transporting four-wheel vehicles such as automobiles and trucks including:

a track secured to the deck longitudinally of the railroad car;

the track being a channel member having a pair of spaced apart first and second longitudinal vertical walls defining a space therebetween;

the track first wall having a plurality of spaced apart holes in a line;

a pair of movable chock block means for each vehicle transported on the deck to secure the vehicle against longitudinal movement;

each chock block means including a bar with a first end and a second end;

the bar first end having at least two pins which simultaneously engage holes in the first wall from the space between the channel walls;

the pins being mounted beneath the bar bottom and longitudinal to the bar and inward from the bar first end;

the pins having free ends pointed toward the bar second end;

the bar second end having support means for positioning it spaced above the deck surface;

the bar first end extending over the top and in contact with the track with the pins in the holes; and buttress walls projecting downwardly, from the bar first end, adjoining and contactable with the track walls thereby preventing lateral and pivotal movement of the bar relative to the track when the bar second end support means positions it spaced above the deck surface.

18. A railroad car having at least one deck for supporting and transporting four-wheel vehicles such as automobiles and trucks including:

a track secured to the deck longitudinally of the railroad car;

the track being a channel member having a pair of spaced apart first and second longitudinal vertical walls defining a space therebetween;

the track first wall having a plurlaity of spaced apart holes in a line;

a pair of movable chock block means for each vehicle transported on the deck to secure the vehicle against longitudinal movement;

each chock block means including a bar with a first end and a second end;

the bar first end having at least one pin which engages with a hole in the first wall from the space between the channel walls;

the pin being mounted beneath the bar bottom and longitudinal to the bar and inward from the bar first end;

the pin having a free end pointed toward the bar second end;

the bar second end having support means for positioning it spaced above the deck surface;

the bar first end extending over the top and in contact with the track with the pin in the hole; and buttress walls projecting downwardly, from the bar first end, adjoining and contactable with the track walls thereby preventing lateral and pivotal movement of the bar relative to the track when the bar second end support means positions it spaced above the deck surface;

the buttress walls including first and second spaced apart walls;

the first buttress wall being adjacent the pin and located inward from the end of the bar first end;

the second buttress wall being adjacent the end of the bar end; and downward rotation of the bar second end toward the deck pivots the second buttress wall above the track second wall so that longitudinal movement of the bar toward the track frees the pin from the hole thereby permitting the bar to be lifted free of the track.

19. A railroad car having at least one deck for supporting and transporting four-wheel vehicles such as automobiles and trucks including:

a track secured to the deck longitudinally of the railroad car;

the track being a channel member having a pair of spaced apart first and second longitudinal vertical walls defining a space therebetween;

the track first wall having a plurality of spaced apart holes in a line;

a pair of movable chock block means for each vehicle transported on the deck to secure the vehicle against longitudinal movement;

each chock block means including a bar with a first end and a second end;

the bar first end having at least one pin which engages with a hole in the first wall from the space between the channel walls;

the pin being mounted beneath the bar bottom and longitudinal to the bar and inward from the bar first end;

the pin having a free end pointed toward the bar second end;

the bar second end having support means for positioning it spaced above the track;

the bar first end extending over the top and in contact with the track with the pin in the hole; and buttress walls projecting downwardly, from the bar first end, adjoining and contactable with the track walls thereby preventing lateral and pivotal movement of the bar relative to the track when the bar second end support means positions it spaced above the deck surface.

20. A railroad car according to claim 19 in which the support means constitutes a pivotal leg and the leg has means to lock it on the bar in substantially vertical and horizontal positions.

21. A railroad car having at least one deck for supporting and transporting four-wheel vehicles such as automobiles and trucks including:

a track secured to the deck longitudinally of the railroad car;

the track being a channel member having a pair of spaced apart first and second longitudinal vertical walls defining a space therebetween;

the first wall having a plurality of spaced apart holes in a line;

a pair of movable chock block means for each vehicle transported on the deck to secure the vehicle against longitudinal movement;

each chock block means including a bar with a first end and a second end;

the bar having means to receive and secure the end of a tie-down strap which runs over the tire of a vehicle;

the bar first end having at least one pin which engages with a hole in the first wall from the space between the channel walls;

the pin being mounted beneath the bar bottom and longitudinal to the bar and inward from the bar first end;

the pin having a free end pointed toward the bar second end;

the bar second end having support means for positioning it spaced above the deck surface;

the bar first end extending over the top and in contact with the track with the pin in the hole; and buttress walls projecting downwardly, from the bar first end, adjoining and contactable with the track walls thereby preventing lateral and pivotal movement of the bar relative to the track when the bar second end support means positions it spaced above the deck surface.

22. A railroad car according to claim 21 in which the means to receive and secure the end of a tie-down strap includes means for applying tension to the strap.

23. A railroad car according to claim 22 in which the means for applying tension to the strap includes a winch.

* * * * *